US 6,749,207 B2

(12) United States Patent
Nadeau

(10) Patent No.: US 6,749,207 B2
(45) Date of Patent: Jun. 15, 2004

(54) UTILITY CART FOR TRANSPORTING AND/OR DISPLAYING VEHICLE LOADS

(76) Inventor: Rosemarie Nadeau, 203 Frankford Ave., Neptune, NJ (US) 07753

(*) Notice: Subject to any disclaimer, the term of this patent is extended or adjusted under 35 U.S.C. 154(b) by 45 days.

(21) Appl. No.: 10/244,178

(22) Filed: Sep. 16, 2002

(65) Prior Publication Data

US 2004/0051265 A1 Mar. 18, 2004

(51) Int. Cl.[7] .................................................. B60P 1/64
(52) U.S. Cl. .......................... 280/47.35; 280/47.24; 280/79.3; 414/498
(58) Field of Search .................. 414/498; 280/47.24, 280/79.11, 79.3, 47.34, 47.35, 651, 655, 47.17

(56) References Cited

U.S. PATENT DOCUMENTS

| | | | | | |
|---|---|---|---|---|---|
| 1,640,263 A | * | 8/1927 | Burgett | ......................... | 414/495 |
| 4,078,269 A | * | 3/1978 | Weipert | ......................... | 5/611 |
| 4,288,195 A | * | 9/1981 | Brewer | ......................... | 414/608 |
| 4,316,687 A | * | 2/1982 | Lindskog | ...................... | 410/92 |
| 4,632,627 A | * | 12/1986 | Swallows | .................... | 414/490 |
| 5,018,931 A | * | 5/1991 | Uttley | ......................... | 414/495 |
| 5,135,350 A | * | 8/1992 | Eelman et al. | .............. | 414/800 |
| 5,224,812 A | * | 7/1993 | Oslin et al. | ................. | 414/401 |
| 5,570,988 A | * | 11/1996 | Gallaway et al. | ........... | 414/498 |
| 6,431,319 B1 | * | 8/2002 | Myers et al. | ................ | 187/243 |
| 6,575,491 B2 | * | 6/2003 | Miller | ......................... | 280/638 |
| 6,615,973 B2 | * | 9/2003 | Fritter | ......................... | 198/498 |
| 2003/0071427 A1 | * | 4/2003 | Simione | .................. | 280/47.34 |

* cited by examiner

Primary Examiner—Bryan Fischmann
Assistant Examiner—Kelly E. Campbell
(74) Attorney, Agent, or Firm—Charles I. Brodsky

(57) ABSTRACT

A utility cart of adjustable height having a top tray with integrated wheels to be rolled into the cargo area of a vehicle as it is detached from the base of the cart—with the base of the cart having its own integrated wheels for use as a separable dolly—and with the top tray being dimensioned to fit flat within the cargo area of the vehicle in transporting cargo loads, and to fit through standard doorway widths when coupled with the base as a display cart of the cargo load.

18 Claims, 6 Drawing Sheets

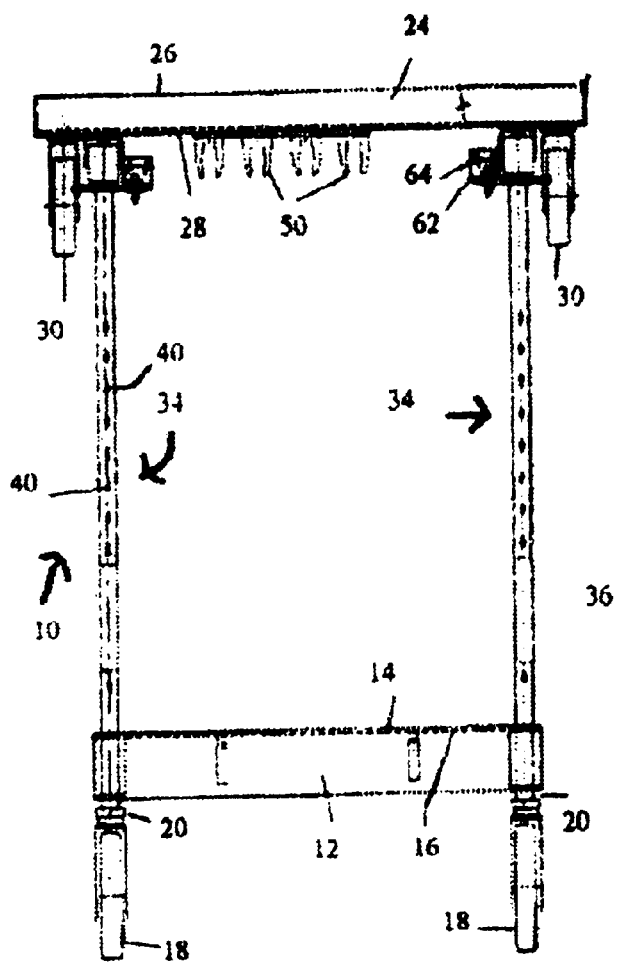
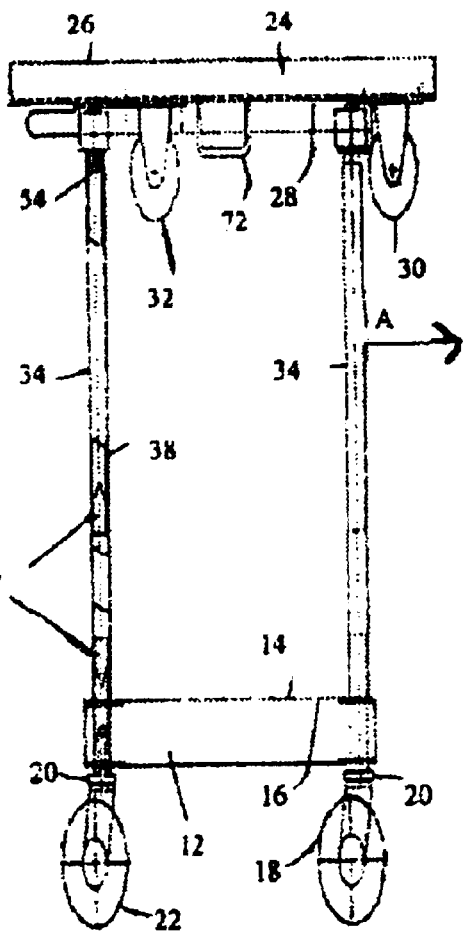
FIG. 1
FIG. 2

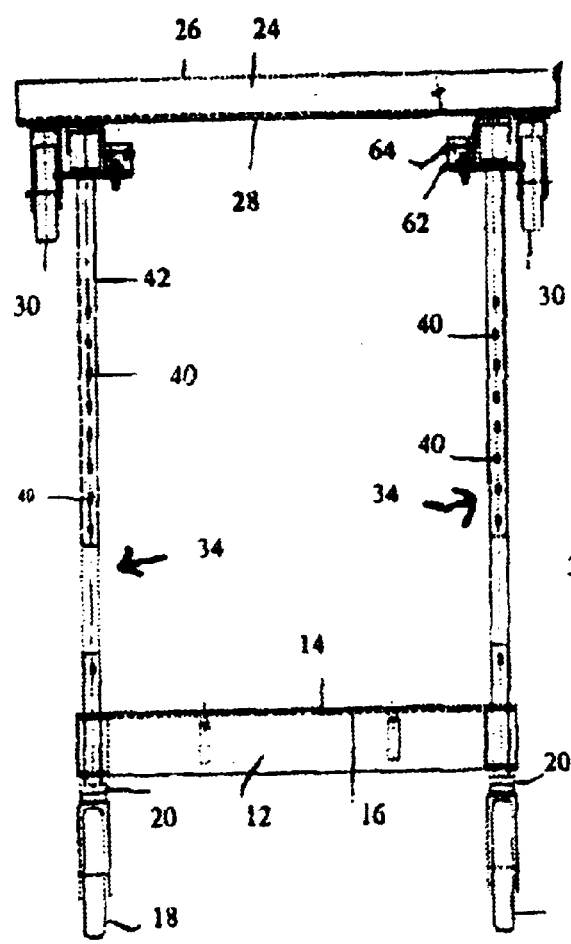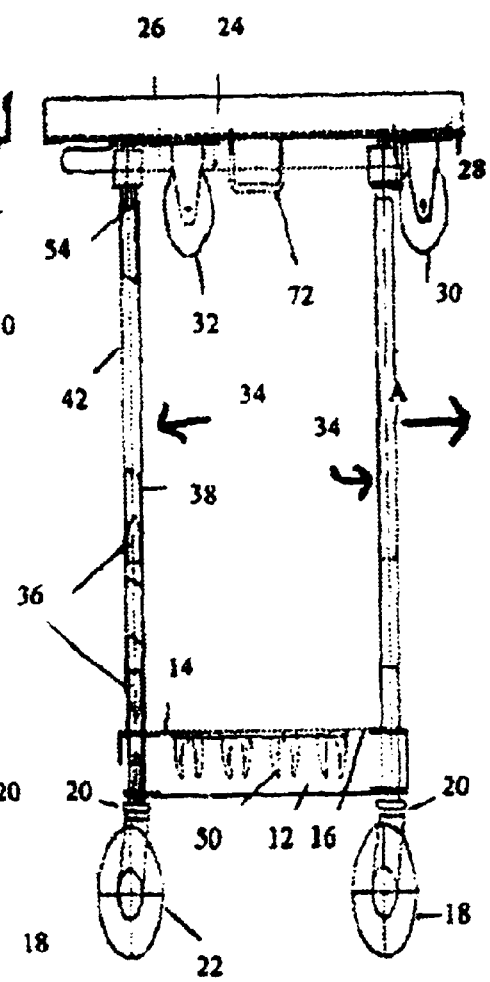

FIG. 5
FIG. 6
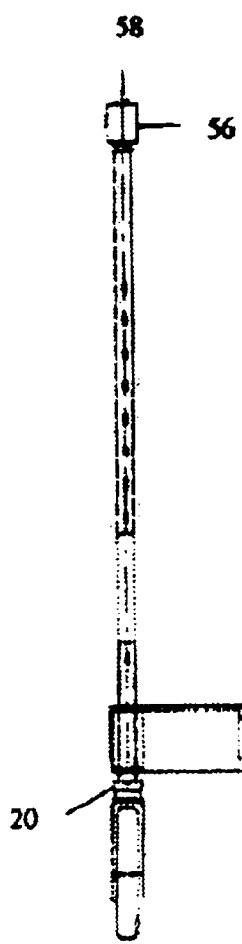
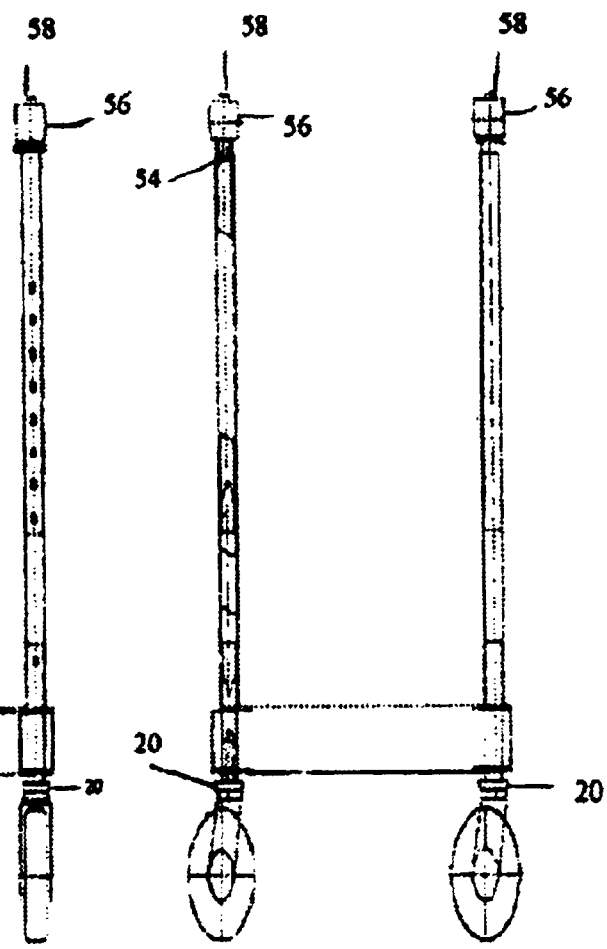

FIG. 10
FIG. 11
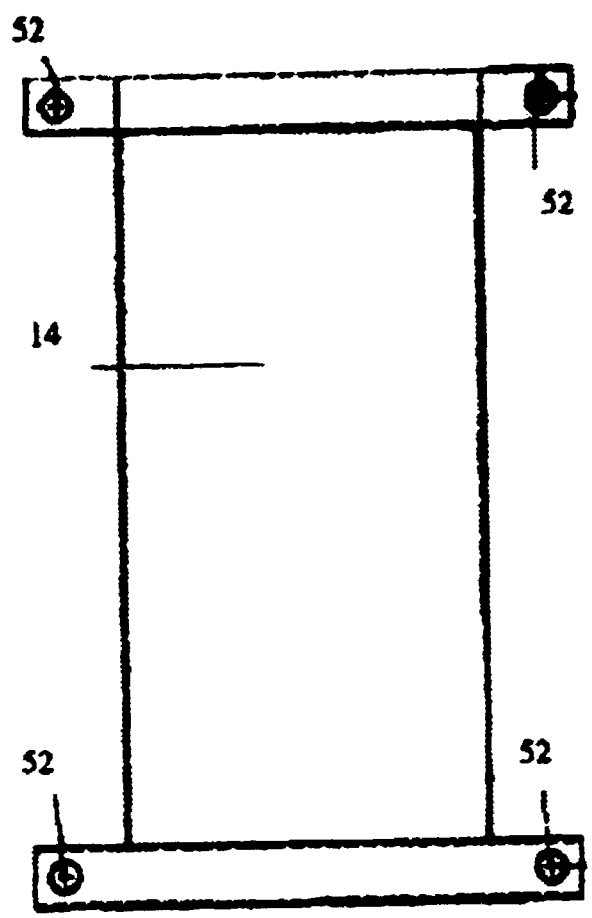
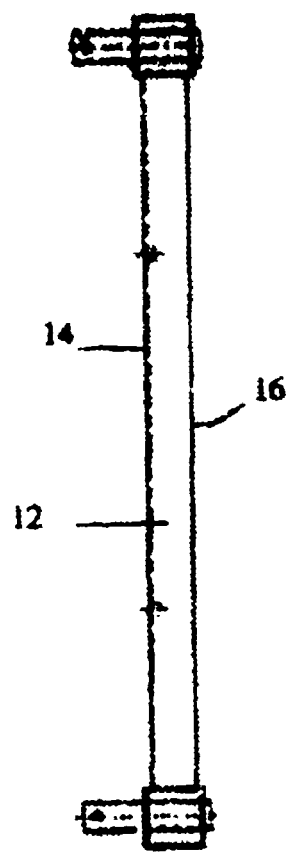

UTILITY CART FOR TRANSPORTING AND/OR DISPLAYING VEHICLE LOADS

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the use of utility carts, in general, and to the utilization of such carts for transporting heavy loads to and from a vehicle cargo area—oftentimes of a type to be displayed for sale.

2. Description of the Related Art

As will become clear from the following description, the present invention results from a desire to be able to transfer heavy or multiple objects to and from the cargo area or rear of a sport utility vehicle, a minivan or a pick-up truck in a manner which avoids heavy lifting, and/or the disassembly of the objects before transfer. Manufacturers' representatives and sales engineers, for example, oftentimes are called upon to bring computers, keyboards, monitors, projectors and others of their wares, to sales presentations—where the equipments are unloaded from their vehicle's cargo area onto a utility cart, brought to the meeting, and then taken off the cart for storage back in the cargo area of the vehicle after the presentation is completed; as will be appreciated, many of these equipments are heavy and/or bulky, and not otherwise easy to transport about. The same will be understood to be the case as well for just simply transporting groceries from a supermarket to its parking lot for loading, or for the similar purchase and loading of television sets, air-conditioners, microwaves and like appliances purchased from department stores. And, as will be understood, the problem in lifting heavy or bulky loads into the cargo area of one's vehicle becomes all the more of a chore with the increasing advent of sport utility vehicles built higher off the ground. As a result, the ability to transfer these types of loads into, and then out from the rear cargo area of the vehicle becomes all the more difficult.

Utility carts for transporting equipment about are, of course, known:

a. In U.S. Pat. No. 1,640,263, for example, a two cart combination is disclosed for transporting baggage, mail and other merchandise to a car or truck. The larger cart is height adjustable so that the smaller cart aligns with, and can roll off the larger cart into the rear of the vehicle. In addition to the front and rear wheels, a pair of large central wheels are present which permit the easy rotation of the cart about its axis;

b. U.S. Pat. No. 2,650,731 sets out a particular design for a transportation cart, utilizable for mail baggage loading, specifically into trains;

c. U.S. Pat. No. 3,021,795, on the other hand, adds an ability for the cart to act as a storage system, such as for food trays as seen in airplane usage;

d. U.S. Pat. No. 3,118,553 attempts to go further by adding an ordinary shopping cart to the carrying cage portion of a cart so that a user does not have to unload and reload the shopping bags in bringing them home, while at the same time keeping the parcels organized during their transportation;

e. U.S. Pat. No. 3,305,117 describes a double-hand truck comprised of an upper and lower rolling platform which are separable when the items are placed in their desired location, in order that the parcels can still be moved without the need to have a large truck available so to do;

f. U.S. Pat. No. 3,869,052 goes further in describing a cart for loading oven components, whereby a tray having rollers on its bottom is loaded with items to be cooked, and then the tray itself is rolled into the open oven;

g. U.S. Pat. No. 4,288,195 describes a rolling lift-jack type assembly which enables large hand trucks to be lifted and rolled into the back of a truck;

h. U.S. Pat. No. 4,604,022 illustrates a trunk loading device for business equipment, including a carrying cart with wheels, a top cart with wheels and a mating trunk mechanism to which the tray cart is rolled onto; and i. U.S. Pat. No. 5,503,424 shows a design of a collapsible shopping cart which collapses for easy storage in the rear of a vehicle, and which has wheels which permit it to be moved about while in its collapsed state.

However, by and large, the utility carts of these prior art designs are quite bulky, in making it difficult for a user not only to transfer the load to and from the vehicle cargo area, but to store the utility cart itself. Even where this might be able to be done, furthermore, provision is absent to prevent the carts and the equipment they carry from being tossed or thrown about as the vehicle is being driven from place-to-place. Moreover, one need only have to spend a few minutes standing in a parking lot to observe how items being transported by these carts shift about just in being rolled to the vehicle, and how oftentimes the user has to stop the cart to center the items once again, if not to lift them back up from the ground onto which they have fallen. Even putting aside the weight and bulkiness of the items being loaded into the cargo area of the vehicle, the problems arise anew once the vehicle arrives back home, where the process of removing, lifting, and carrying begins again. Those utility carts described in the prior art and/or generally available do not provide a collapsible utility cart which allows a user to efficiently transfer a load both into, and out from, the vehicle's cargo area without having to lift the load and secure it in place. Nor do such carts provide any degree of protection to the floor of the cargo area from the contents of the load being carried. If used by a manufacturer's representative for presentation at a sales show, for example, such utility carts also fail to allow for a ready display of the contents, along with product advertising where desired.

SUMMARY OF THE INVENTION

As will be seen from the following description, the utility cart of the invention comprises a dolly having a generally planar top surface, an underside and a first plurality of wheels at the underside for rolling the dolly about. A tray having a generally planar top surface is also included, having an underside and a second plurality of wheels at such underside for rolling the tray about as well. In a preferred embodiment, a plurality of legs are employed which, when coupled between the top surface of the dolly and the underside of the tray form a 2-shelf movable utility cart of the dolly and tray operating together, and such that when detached therefrom, allows the dolly and tray to be independently movable. To enable the utility cart to be loaded into, and unloaded from, a motor vehicle, the tray is of a width and depth to slide into the cargo area of a sport utility vehicle or minivan, for example, when the plurality of legs are detached. Such legs are of a first length when the combination is utilized with the cargo area of a sport utility vehicle, which will be seen to be greater than a second length when the combination is utilized in loading and unloading the cargo area of a minivan. In accomplishing this, the legs are adjustable in length in controlling the separation between the dolly and the tray when coupled together, as where the legs are telescopically extendible. In this manner, a 2-shelf movable utility cart is formed.

In accordance with the invention, the legs, when detached, may be stored at the underside of either the dolly or the tray, as by a plurality of clamps. When forming the utility cart for use, the legs include a first end which fits within a socket in the top surface of the dolly, and a second end which slides within a track in the underside of the tray in coupling the combination together. Such second end of the legs may include a transfer ball which slides within the tray track so as to be captured within a groove at a remote end of the track. Once in place, the transfer balls are captured within the grooves by an appropriate locking arrangement. To ease the loading and unloading of the tray into the cargo area of the motor vehicle, a pair of handles are provided on opposite sides of the tray, substantially flush therewith. Such handles, however, are adjustable outwardly from, and inwardly toward, the tray in maneuvering the tray about, and in inserting the tray into the cargo area to obtain maximum clearance from its closure lid. Once inserted, the handles are tied-down within the cargo area to secure the tray against movement as the vehicle proceeds in motion.

Various attachments and accessories are employable with the cart, according to the invention, to enhance its usefulness in product display and presentation. For example, a lip can be included, extending upwardly from edges defining the generally planar top surface of the tray to prevent any articles thereon from falling to the ground. Extensions can be detachably coupled to the tray for increasing its ability to carry and display items, and a variety of caster wheels can be employed to ease the cart's maneuverability. In a preferred embodiment, swivel caster wheels are utilized at the underside of the dolly, while rigid caster wheels are employed at the underside of the tray. Such wheels may be "colored" to enhance appearance—although experience has shown that such "colorization" is of a more meaningful effect when utilized only for the swivel caster wheels, rather than for the rigid caster wheels. Testing has shown that a lightweight durable aluminum is highly desirable for the legs which couple the dolly and tray together; and when fabricated to support a weight upwards of 275 pounds, the cart of the invention is particularly useful not only as a product display cart, but as a utility cart also usable in transporting heavy items (such as appliances) from a storage area to a counter area—or, further, out to a vehicle in a parking lot.

BRIEF DESCRIPTION OF THE DRAWINGS

These and other features of the present invention will be more clearly understood from a consideration of the following description, taken in connection with the accompanying drawings, in which:

FIGS. 1 and 2 are rear and left side views of a first embodiment of the invention, their front and right side views being mirror images;

FIGS. 3 and 4 are rear and left side views, respectively, of a second embodiment of the invention—with their front and right side views likewise being mirror images;

FIGS. 5 and 6 are front and side views helpful in an understanding of the telescoping legs which couple the dolly and tray of the cart together;

FIGS. 10 and 11 are top and front views of the dolly of the cart, respectively.

DETAILED DESCRIPTION OF THE INVENTION

Figure 7:
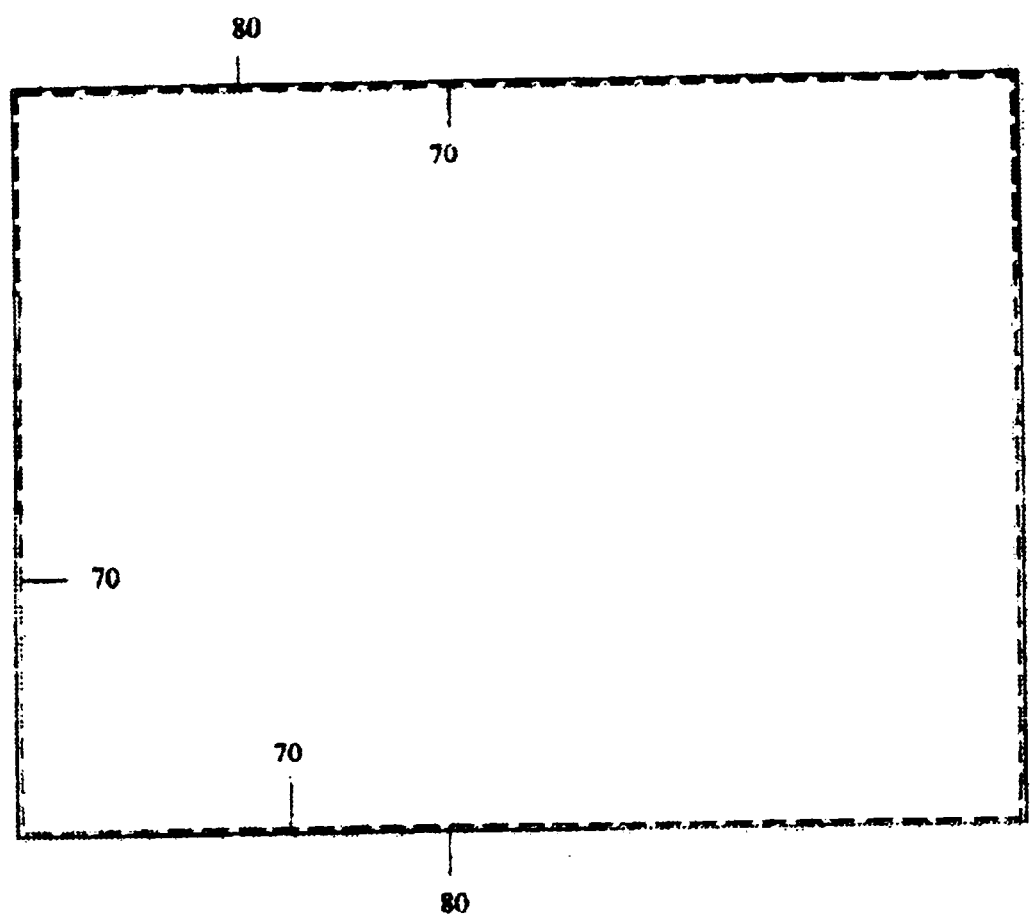
FIGS. 7–9 are top, underside and edge views of the tray of the utility cart, respectively.

In the Drawings, the utility cart 10 for transporting heavy loads to and from a vehicle cargo area according to the invention includes a dolly 12 having a generally planar top surface 14, an underside 16, and pairs of front and rear wheels 18, 22. Such wheels preferably comprise swivel caster wheels for ease of movement, of a grey or other color. Such wheels may be of 4 inch diameter, and couple to the dolly 12 by a socket 20 in well known manner. Preferably, the rear wheels 22 are provided with a brake, while the front wheels 18 are provided without a brake. This allows forward movement in the direction of the arrow A (FIGS. 2 & 4).

The utility cart 10 also includes a tray 24 having a generally planar top surface 26, an underside 28 and a second plurality of wheels—30 at its forward edge and 32 rearwardly thereof. Such wheels 30, 32 may be of smaller diameter—such as 3 inch—, rigid, and preferably of a grey color. With the dolly 12 and tray 24 coupled together by a plurality of legs 34, the tray 24 essentially comprises a table top for the utility cart 10 while the dolly forms its base. As will be appreciated, various equipments can be wheeled about, carried on the dolly 12 and tray 24, individually. Such legs 34, when coupled between the top surface 14 of the dolly 12 and the underside 28 of the tray 24, thus forms a 2-shelf movable utility cart, and when detached therefrom, allow the dolly 12 and tray 24 to be independently movable. As will be appreciated, the wheels 30, 32 may be secured to the underside 28 of the tray 24 by carriage bolts along with flat washers and lock nuts (not shown).

Such legs 34, are of a type to be adjustable in length in controlling the separation between the dolly 12 and the tray 24 when coupled together. Telescopically extendable as shown in FIGS. 1 and 3, a series of snap buttons 36 on the inside tube 38 fit within aligned apertures 40 on the outside tube 42 of the legs 34.

In operation, the legs 34 are extended to a first length when dolly 12 and tray 24 are joined for loading and unloading the cargo area of a sport utility vehicle, and are of a shorter length when extended to utilize the dolly 12-tray 24 combination in loading and unloading the cargo area of a minivan built closer to the ground.

In accordance with the invention, a plurality of clamps 50 are provided at the underside 16 of the dolly 12 or at the underside 28 of the tray 24 for storing the legs once detached from between the dolly 12 and the tray 24. The clamps 50 may be of a spring-action-hold shown at the underside 16 of the dolly 12 in FIG. 4—but preferably, at the underside 28 of the tray 24 in FIG. 1. The combination of the clamps 50 for storing the legs 34 may be secured in place through a series of button head screws. As will be appreciated, such clamps extend along the length of the underside of the dolly or tray, from front-to-back, in holding the opposing ends of the legs 34—so that eight sets of such clamps are employed.

Figure 8:
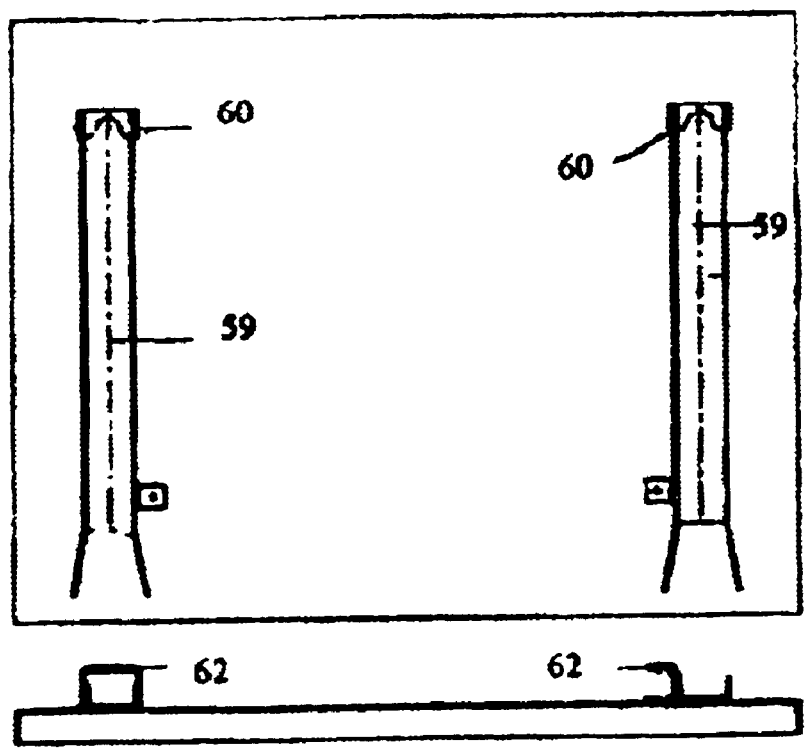
Figure 9:
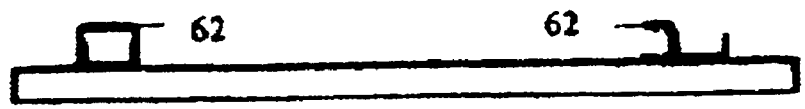

FIGS. 5–6, 8–9, 10 and 12 are helpful in understanding the manner by which the legs 34 couple between the dolly 12 and tray 24 in forming the 2-shelf movable cart of the invention. As FIGS. 10 and 12 illustrate, the dolly 12 includes 4 apertures 52 through which one end of the legs 34 pass in resting upon the caster socket 20 of FIGS. 1–4. As illustrated in FIG. 6 (as well as in FIGS. 2 and 4), a round tee-joint fastener 54 seats within the upper end of the inner tube 38 of the extendable leg 34 in coupling to a stud mount transfer ball 56, the ball portion 58 of which fits within a track 59 in the underside 28 of the tray 24—and slides within the track 59 until captured within a groove 60 at the remote end to couple therewith (FIGS. 8 and 9). Once within the groove 60, the leg 34 is secured in position by a latch 62 and extension spring 64 or other appropriate securement lock (FIGS. 1 and 3). The left side of FIG. 9 shows the leg 34 in secured position, with the right side showing the latch 62 and spring 64 prior to complete securement. FIG. 7 illustrates a top view of the tray 24, with the section shown by the dotted line 70 representative of a lip extending upwardly from the edge surfaces of the tray 24 in defining the generally planar top surface of the tray. FIGS. 5 and 6 are also helpful in understanding how, with the tray 24 removed, the utility cart of the invention can be moved about by pushing or pulling on the legs 34 wherein only the dolly 12 serves in transporting carried items from place to place.

Once the tray 24 is decoupled from the utility cart—by uncoupling the latch 62 and sliding the transfer ball 56 from the groove 60 and track 59, the tray 24 can be slid into the cargo area of a sport utility vehicle or minivan by means of the wheels 30, 32. (Because the movement is over a short distance within the cargo area only, these wheels 30, 32 may be of the rigid variety, as noted previously.) To facilitate the insertion into the cargo area, a pair of handles 72 are secured on opposite sides of the tray 24, adjustable outwardly from, and inwardly toward, the tray 24 so as to lay substantially flush when fully inserted (FIGS. 2 and 4). By having flush fitting handles, less cargo area is required. By having the handles 72 adjustable outwardly, straps can be employed extending between the handles 72 and tie-downs within the cargo area of the vehicle to secure the tray against movement when the vehicle is driven about. The decoupled legs may be placed between the spring action clamps 50 at the underside of the tray, as in FIG. 1—or, if the utility cart be one in which the spring action clamps are located on the underside of the dolly 12 as in FIG. 4, the legs 34 are there placed in position before lifting the dolly and likewise placing it for storage in the cargo area. Various extensions can be coupled to the tray 24, as at 80 in FIG. 7, to provide room for carrying additional items and/or displaying various manners of advertisement that might be applicable. In a preferred construction of the invention, the tray 24 was constructed of a 35 inch width and a 30 inch depth so as to not only slide easily within the cargo area of the sport utility vehicle or minivan, but to be able to fit through the opening of standard doorways in transporting the cart about through offices, storage areas, hallways, etc.

While there have been described what are considered to be preferred embodiments of the present invention, it will be readily appreciated by those skilled in the art that modifications can be made without departing from the scope of the teachings herein. For example, whereas the utility car of the invention has ben described of a construction wherein the legs 34 are preferably fabricated of a lightweight durable aluminum, and of a strength to support a weights upwards of 275 pounds, it will be understood that other fabrications are possible as well, in still allowing the cart to transport various vehicle loads from place to place, and for displaying equipments carried thereon. For at least such reason, therefore, resort should be had to the claims appended hereto for a true understanding of the scope of the invention.

I claim:
1. The combination comprising:
   a dolly having a generally planar top surface, an underside and a first plurality of wheels at said dolly underside for rolling said dolly about;
   a tray having a generally planar top surface, an underside and a second plurality of wheels at said tray underside for rolling said tray about;
   a plurality of legs, when coupled between said top surface of said dolly and said underside of said tray forming a 2-shelf movable utility cart of said dolly and tray operating together, and when detached therefrom, allowing said dolly and said tray to be independently, movable; and
   a plurality of clamps at said underside of one of said dolly and said tray for storing said legs when detached from between said dolly and said tray.

2. The combination of claim 1 wherein said plurality of legs are adjustable in length in controlling separation between said dolly and said tray when coupled together.

3. The combination of claim 2 wherein said plurality of legs are telescopically extendable.

4. The combination of claim 2 wherein 4 legs couple between said dolly and said tray in forming said 2-shelf movable utility cart.

5. The combination of claim 2 wherein said plurality of legs are of a first length when said combination is utilized in loading and unloading the cargo area of a sport utility vehicle greater than a second length when said combination is utilized in loading and unloading the cargo area of a minivan.

6. The combination of claim 5 wherein said tray is of a width and depth to slide into the cargo area of said sport utility vehicle and said minivan when said plurality of legs are detached.

7. The combination of claim 6 wherein said tray is of a width and depth of the order of 35 inches and 30 inches, respectively.

8. The combination of claim 7, also including a lip extending upwardly from edge surfaces defining the generally planar top surface of said tray.

9. The combination of claim 8, further including means detachably coupled to said tray in providing an extension thereto for purposes of carrying and display.

10. The combination of claim 6, also including a pair of handles on opposite sides of said tray substantially flush therewith.

11. The combination of claim 10 wherein said handles are adjustable outwardly from, and inwardly toward, said tray.

12. The combination or claim 1 wherein said plurality of legs include a first end fitting with a socket in said top surface of said dolly, and a second end sliding within a track in said underside of said tray in coupling therewith.

13. The combination of claim 12 wherein said second end of said plurality of legs includes a transfer ball sliding within said tray track to be captured within a groove at a remote end thereof in coupling therewith.

14. The combination of claim 12, also including means locking said legs in place when said transfer balls are captured within said grooves.

15. The combination of claim 1, wherein said first and second plurality of wheels comprises swivel caster wheels and rigid caster wheels, respectively.

16. The combination of claim 15 wherein said rigid caster wheels are of a gray color, and wherein said swivel caster wheels are of a gray or other color.

17. The combination of claim 1, wherein said dolly, said tray and, said plurality of legs are fabricated of a lightweight durable aluminum.

18. The combination of claim 1 wherein said dolly, said tray and said plurality of legs are fabricated of a lightweight durable aluminum of strength to support a weight upwards of 275 pounds.

* * * * *